(12) United States Patent
Yue (10) Patent No.: US 7,806,028 B2
(45) Date of Patent: *Oct. 5, 2010

(54) NUTSHELL CRACKER AND METHOD OF USE

(76) Inventor: Chi Yau Yue, Block A, Unit 10, 5/F, Profit Industrial Bldg. 1-15, Kwai Fung Cresent, Hong Kong (HK) 852

( * ) Notice: Subject to any disclaimer, the term of this patent is extended or adjusted under 35 U.S.C. 154(b) by 382 days.

This patent is subject to a terminal disclaimer.

(21) Appl. No.: 11/313,045

(22) Filed: Dec. 21, 2005

(65) Prior Publication Data

US 2007/0137448 A1      Jun. 21, 2007

(51) Int. Cl.
*B26D 1/00*      (2006.01)
*A47J 43/26*      (2006.01)
(52) U.S. Cl. ............................ 83/13; 30/120.1; 30/120.5
(58) Field of Classification Search ................ 30/120.1, 30/120.2, 120.3, 120.4, 120.5; 99/568, 579, 99/581; 83/13
See application file for complete search history.

(56) References Cited

U.S. PATENT DOCUMENTS

| | | | | |
|---|---|---|---|---|
| 1,370,137 A | * | 3/1921 | Lopes | ........................ 30/120.4 |
| 1,436,571 A | * | 11/1922 | Bokor | ........................ 30/120.4 |
| 1,483,456 A | * | 2/1924 | Kroon | ........................ 30/120.4 |
| 1,626,905 A | * | 5/1927 | Zifferer | ........................ 30/120.4 |
| 1,938,733 A | | 12/1933 | Carlson | |
| 2,691,501 A | * | 10/1954 | Spencer | ........................ 248/168 |
| 2,989,103 A | | 6/1961 | Walling | |
| 4,171,567 A | * | 10/1979 | Papalardo | .................. 30/120.4 |
| 4,183,967 A | | 1/1980 | Nelson | |
| 4,370,922 A | | 2/1983 | Rollband | |
| 4,909,140 A | | 3/1990 | Burlock | |
| 4,996,917 A | | 3/1991 | Burlock | |
| 5,206,997 A | | 5/1993 | Cunningham | |
| 5,711,213 A | | 1/1998 | Thomson | |
| 5,800,256 A | | 9/1998 | Bermudez | |
| 5,842,410 A | * | 12/1998 | Comeaux | ...................... 99/581 |
| 5,879,734 A | | 3/1999 | Broyles | |
| 5,931,087 A | | 8/1999 | Spencer | |
| 6,052,906 A | * | 4/2000 | Weibel | ........................ 30/120.3 |
| 6,135,020 A | | 10/2000 | Broyles | |
| 6,279,232 B1 | * | 8/2001 | Cho | ........................... 30/120.1 |
| 6,785,967 B1 | * | 9/2004 | Allievi | ....................... 30/120.1 |
| 2004/0194317 A1 | | 10/2004 | Pippert | |
| 2004/0251357 A1 | | 12/2004 | Lenzkes | |

(Continued)

*Primary Examiner*—Boyer D Ashley
*Assistant Examiner*—Omar Flores-Sánchez
(74) *Attorney, Agent, or Firm*—InterContinental IP; Eric A. Hanscom; Todd J. Langford (57) ABSTRACT

This invention is directed toward a nutshell cracker and method of use. The nutshell cracker has three or more cracking members, each with a concave cracking surface, a central slot on its top with eyelets on either side. The 3-D design and curvature of the invention make it stylish, sleek, and attractive, and suitable for storage upon a table or kitchen countertop. The cracking members rotate about the connecting member, surrounding the nut on three or more sides, thereby allowing the user to apply less pressure per cracking member to achieve the same overall pressure upon the nutshell as would be applied through use of a traditional nutcracker. Having cracking members on three or more sides also increases the ability of the invention to constrain the nutshell during cracking and decreases the chances that once cracked, the actual nut will squirt out the side and fall on the floor.

12 Claims, 5 Drawing Sheets

U.S. PATENT DOCUMENTS

2005/0045050 A1  3/2005  Broyles et al.
2005/0181716 A1  8/2005  Gillespsie
2007/0137046 A1* 6/2007  Yue .......................... 30/120.4

* cited by examiner

NUTSHELL CRACKER AND METHOD OF USE

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF THE INVENTION

This invention is directed toward a nutshell cracker and method of use. The nutshell cracker has three or more cracking members, each with a concave cracking surface, a central slot on its top with eyelets on either side. The 3-D design and curvature of the invention make it stylish, sleek, and attractive, and suitable for storage upon a table or kitchen countertop. The cracking members rotate about the connecting member, surrounding the nut on three or more sides, thereby allowing the user to apply less pressure per cracking member to achieve the same overall pressure upon the nutshell as would be applied through use of a traditional nutcracker. Having cracking members on three or more sides also increases the ability of the invention to constrain the nutshell during cracking and decreases the chances that once cracked, the actual nut will squirt out the side and fall on the floor.

The effective cracking of nuts has been a problem facing humans throughout recorded history. Nuts have long been sought as a good source of food, but most commonly eaten varieties are protected with a hard shell, which needs to be cracked before the nut can be removed from the shell and eaten. Presumably the first nut cracking invention was the use of a small rock to cracks nuts against a larger rock, but over time humans realized that using leverage, they could crack nuts by pulling two opposing cracking members toward each other when the cracking members were connected at their tops.

Humans living close to the ocean were also faced with the problem of how to crack the hard shell and legs of crabs and lobsters. It is thought that they also began smashing the shells with rocks, then trying to salvage the meat from the broken shells. Over time it was discovered that the same principles as were used with primitive nut crackers could be used to effectively crack—but not smash—the shells and leg portions of crabs and lobsters, thereby preserving more of the meat.

As humans evolved, however, so did their tool-making abilities and their desire for cleaner, more effective and less messy methods of removing a nut from a nutshell and meat from a crab or lobster leg or pincher.

The prior art has several examples of attempts to resolve this problem. There are a number of mass-production shelling methods, such as those found in U.S. Pat. Nos. 5,879,734 and 6,135,020 to Broyles, 5,931,087 to Spencer, 5,711,213 to Thomson, 4,183,967 to Nelson, 4,996,917 and 4,909,140 to Burlock, and US Patent Application No. 20050045050 to Broyles. The devices are not, however, useful for the average consumer who wishes to crack several rather than several thousand nuts at a time.

In terms of tools useful for the average consumer, there are a number of nutcrackers with two cracking members, such as U.S. Pat. Nos. 1,938,733 to Carlson, 2,989,103 to Walling, 5,206,997 to Cunningham, 4,370,922 to Rollband, and US Patent Application Nos. 20040194317 to Pippert and 20040251357 to Lenzkes. None of these nutcrackers, however, effectively contain the nut within the cracking members to the degree that the current invention does, nor are any of them designed to stand upright or serve as an attractive decoration in the dining room or kitchen area when not in use. Many of these inventions are also quite complex, with a large number of adjustments needed for use and a large number of moving parts, thereby rendering them expensive to product and difficult to use, clean, and take apart for repair or replacement of parts.

The prior art includes several tools designed to remove the meat from crustaceans, such as those found in U.S. Pat. No. 5,800,256 to Bermudez and US Patent Application No. 20050181716 to Gillespsie. These meat picking tools, while facing a similar problem—how to get a desired article of food out from a hard, protective shell—deal with an entirely different type of approach: namely, the insertion of the tool and removal of the crustacean meat without cracking open entirely the crustacean shell prior to removing the meat.

Thus there has existed a long-felt need for nutcracker usable by an average single consumer of nuts, as opposed to a nut-processing factory, which is stylish enough to be left out on a table or kitchen countertop when not in use, but which can also effectively contain a nut for cracking and prevent the nut from squirting out one side or the other as the nutshell is cracked open. A similar need has existed for a device which can efficiently crack open the shells, legs, and pinchers of lobsters and crabs in a manner which cracks the shells but does not crush the inside meat.

The current invention provides just such a solution by having a nutshell cracker that has three or more cracking members, each with a concave cracking surface, a central slot on its top with eyelets on either side. A connecting member with as many radiating partitions as there are cracking members sits in the middle of the invention, where the partitions fit within the slots at the top of the cracking member. Each division has a central hole, where the holes in each division which line up with the eyelets of the cracking members, with a snap pin attaching the cracking member to the connecting member. The cracking members rotate about the connecting member, surrounding the nut on three or more sides, thereby allowing the user to apply less pressure per cracking member to achieve the same overall pressure upon the nutshell as would be applied through use of a traditional nutcracker. Having cracking members on three or more sides also increases the ability of the invention to constrain the nutshell during cracking and decreases the chances that once cracked, the actual nut will squirt out the side and fall on the floor. The 3-D design and curvature of the invention make it stylish, sleek, and attractive, and suitable for storage upon a table or kitchen countertop.

It should be noted that while the primary purpose of this invention is to crack nuts in a manner superior to past methods, the invention can be used to crack the shells, legs, and pinchers of lobsters, crabs, and other hard-shelled animals.

SUMMARY OF THE INVENTION

It is a principal object of the invention to create a nutcracker that effectively retains a nut inside a nutshell within the nutcracker and also retains the nut within the invention as the nutshell is cracked.

It is another principal object of the invention to create a nutcracker with a design that is both decorative and functional, with stylish lines and curves integral to the grasping and cracking surfaces, such that the nutcracker can be left on a table or kitchen countertop as a piece of art when not in use.

Other objects of the invention include:

Providing a nutcracker with three or more cracking members, each with a concave, serrated cracking surface, where the three or more cracking members cradle a nut and effectively prevent the nut from squirting out of the nutcracker during cracking, and also retain the nut inside the cracking members as the nutshell surrounding the nut is cracked.

Providing a nutcracker that can be stored in at least two different upright positions.

Providing a nutcracker with a centerline on its outside edge which allows a user to more securely grip the nutcracker.

Providing a device that can be used to crack the shells of lobsters and crabs.

Providing a device that can be laid flat on a table or other flat object such that the object to be cracked can be nestled in between the two prone cracking members while a person's entire weight can be laid upon the one or more upright cracking members, thereby allowing a person to put his or her weight into the cracking process as opposed to traditional nut crackers where the force exerted by a user of the traditional nut cracker is limited to his or her hand strength.

It is a final object of this invention that the nutcracker can be made from a minimal number of parts and therefore be relatively inexpensive as well as being easy to assemble and take apart for cleaning or replacement of individual parts.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

DETAILED DESCRIPTION OF THE FIGURES

As described in the figures, the invention is a nutshell cracker with unique features, which can also be used to crack crab or lobster shells, legs, and pinchers. The two most obvious features are, first, it has three or more cracking members; second, it is designed with attractive curves such that it can serve as a table decoration when not in use. While most nutcrackers have only two cracking members—either two mirror image cracking members with a hand grip portion and a cracking portion or a "garlic press" design where one member serves to apply pressure to another member which secures the nut—this invention uses more than two cracking members. This allows for superior retention of not only the nutshell and nut before cracking, but also the nut after the nutshell is cracked. Each cracking member has a concave cracking surface, a central slot on its top with eyelets on either side which allows it to be attached to a connecting member. The connecting member has as many partitions as there are cracking members. Inside the approximate center of each partition is a hole which, when the partition is inserted into the slot of the cracking member, can be aligned with the eyelet of the cracking member. A snap pin can then be inserted to rotably attach the cracking member to the connecting member. The cracking members rotate about the connecting member, surrounding the nut on three or more sides, thereby allowing the user to apply less pressure per cracking member to achieve the same overall pressure upon the nutshell as would be applied through use of a traditional nutcracker. Having cracking members on three or more sides also increases the ability of the invention to constrain the nutshell during cracking and decreases the chances that once cracked, the actual nut will squirt out the side and fall on the floor. The second major difference between the invention and traditional nutcrackers is that the 3-D design and curvature of the invention make it stylish, sleek, and attractive, and suitable for storage upon a table or kitchen countertop in either "open" or "closed" positions, as opposed to the traditional nutcracker whose appearance is based solely upon functionality and which is stored out of sight in a kitchen drawer when not in use.

Figure 1:
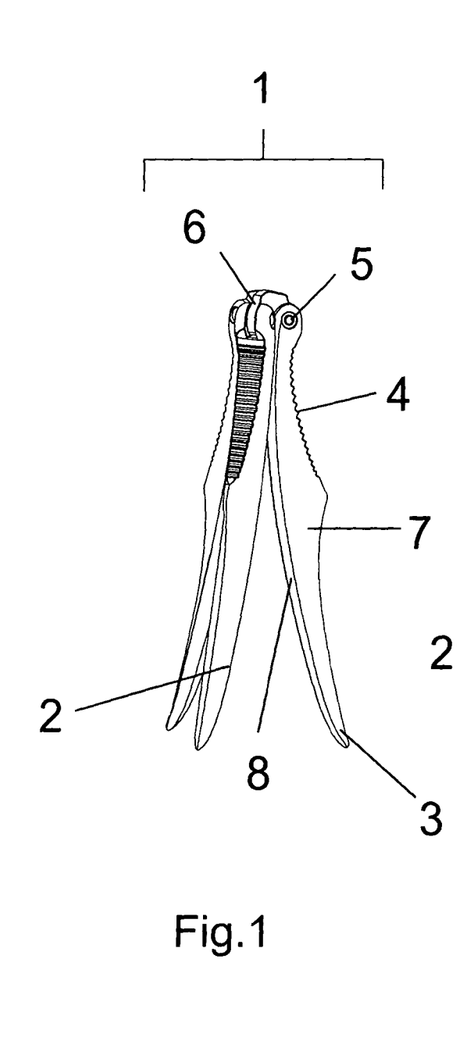
FIG. 1 is a front view of the invention in its open-decorative position.

Turning now to the figures, FIG. 1 is a front view of the invention in its open-decorative position. Most nut crackers on the market today are relatively two-dimensional and have an appearance based solely upon function and not appearance, they do not lend themselves to functionality as standing objects or as objects of art. The current invention because of its attractive shape and three cracking members can be stored or displayed in an upright position when not in use, as illustrated by this figure. FIG. 1 shows the invention, generally indicated by reference number 1, as a user would set it out on a table, countertop, or other location where it would make an attractive accent to the kitchen or dining room when it is not in use. The invention in its preferred iteration is comprised of three cracking members (7) which have tips (3), serrated cracking surfaces (4), a slot (not easily visible in this figure), two eyelets (5), and inside edge (2) and an outside edge (8). Connecting the three cracking members together is a connecting member (6), in this iteration a triangular connecting member. The connecting member is this preferred embodiment has three radiating partitions as there are three cracking members. The triangular cracking member has partitions which fit into the slot in each cracking member. In the middle of each partition is a hole which can be aligned with the eyelet (5) on either side of the cracking member. Through the hole in the connecting member and the eyelets, a snap pin is run, thereby removably attaching all three cracking members to the connecting member such that each cracking member can rotate along a fixed vector out from the connecting member.

Figure 2:
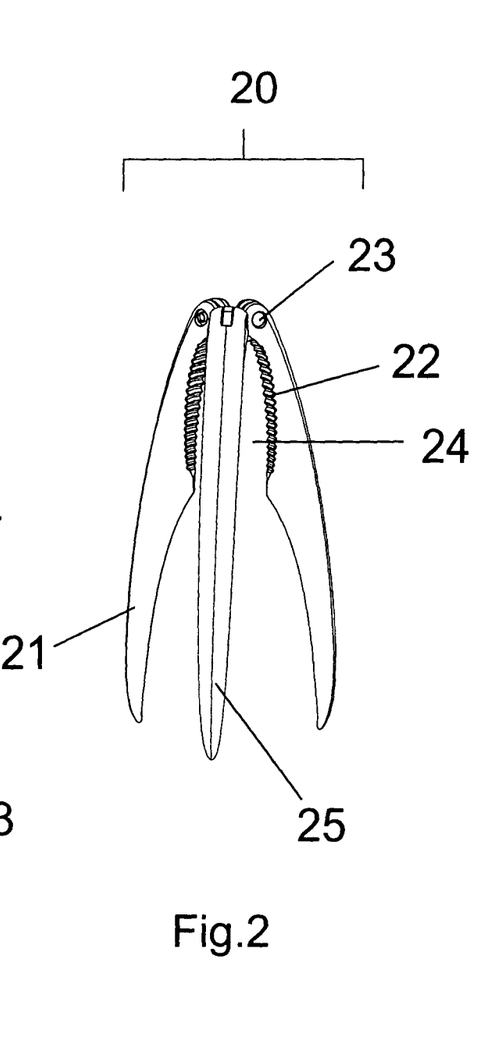
FIG. 2 is a front view of the invention in its closed-decorative position.

FIG. 2 is a front view of the invention in its closed-decorative position. In this figure, the invention, generally indicated by reference number 20, shows a position of the invention where the cracking members have all been rotated around the eyelets (23) such that the serrated cracking surfaces (22) are now facing each other. As pressure is increased upon the outside edge (21) of each cracking member, the gap (24) defined by the three serrated cracking surfaces (22) becomes smaller and smaller. This figure also shows the centerline (25) of the cracking member, which is a slightly raised ridge which runs down the center of the outside edge of each cracking member. The centerline (25) serves to not only stabilize each cracking member in the hand of a user, but also provide an attractive, sleek look to the nut cracker, thereby also allowing for its use as a piece of decorative table art when it is not in use. It should be noted that the invention can be stored or displayed in an upright position in either the open-decorative or closed-decorative positions.

Figure 3:
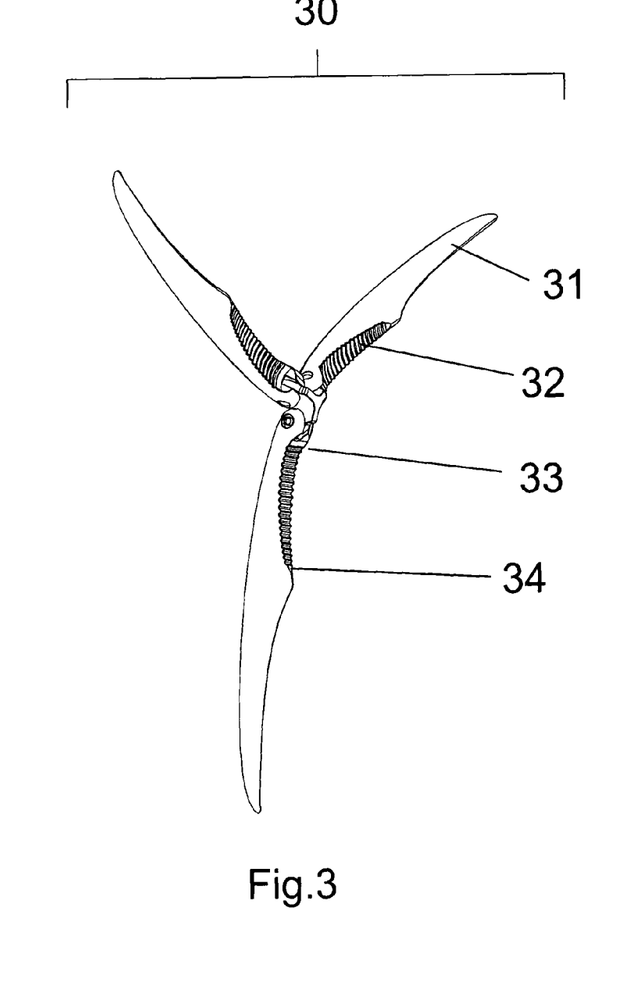
FIG. 3 is a side, perspective view of the invention in its open position.

FIG. 3 is a side, perspective view of the invention in its open position. The invention, generally indicated by reference number 30, appears in an open position with all three cracking members (31) pulled back, thereby increasing the distance between the serrated cracking surfaces (32). The serrated cracking surfaces have an upper curvature (33) and a lower curvature (34). The upper curvature is wider than the lower curvature, with the lower curvature tapering down into the inside edge. The serrated cracking surface is concave in shape such that a nut or other object to be cracked can be contained between the curvatures of the upper curvature and lower curvature. The serrations also serve to anchor the nut and prevent it from sliding up or squirting out the side. Because there are three cracking members, the nutshell is prevented from squirting out the side as pressure is applied upon it. The three (in this drawing) cracking members also allow a person to put pressure on the nut from three directions, rather than the traditional two directions, thereby allowing a user to apply less pressure per cracking member and still deliver the same amount of cracking pressure to the nut. Finally, the use of three or more cracking members solves another problem often found with traditional nut crackers—that even if the user successfully keeps the nutshell within the grasp of the two cracking members, sometimes the actual nut will squirt out one side and fall on the floor. With three (or more) cracking members, there is a greater chance that even if the nutshell is cracked such that the nut squirts out an opening in the nutshell, the nut will be trapped by one or more of the cracking members and retained by the user for immediate or delayed consumption.

Figure 4:
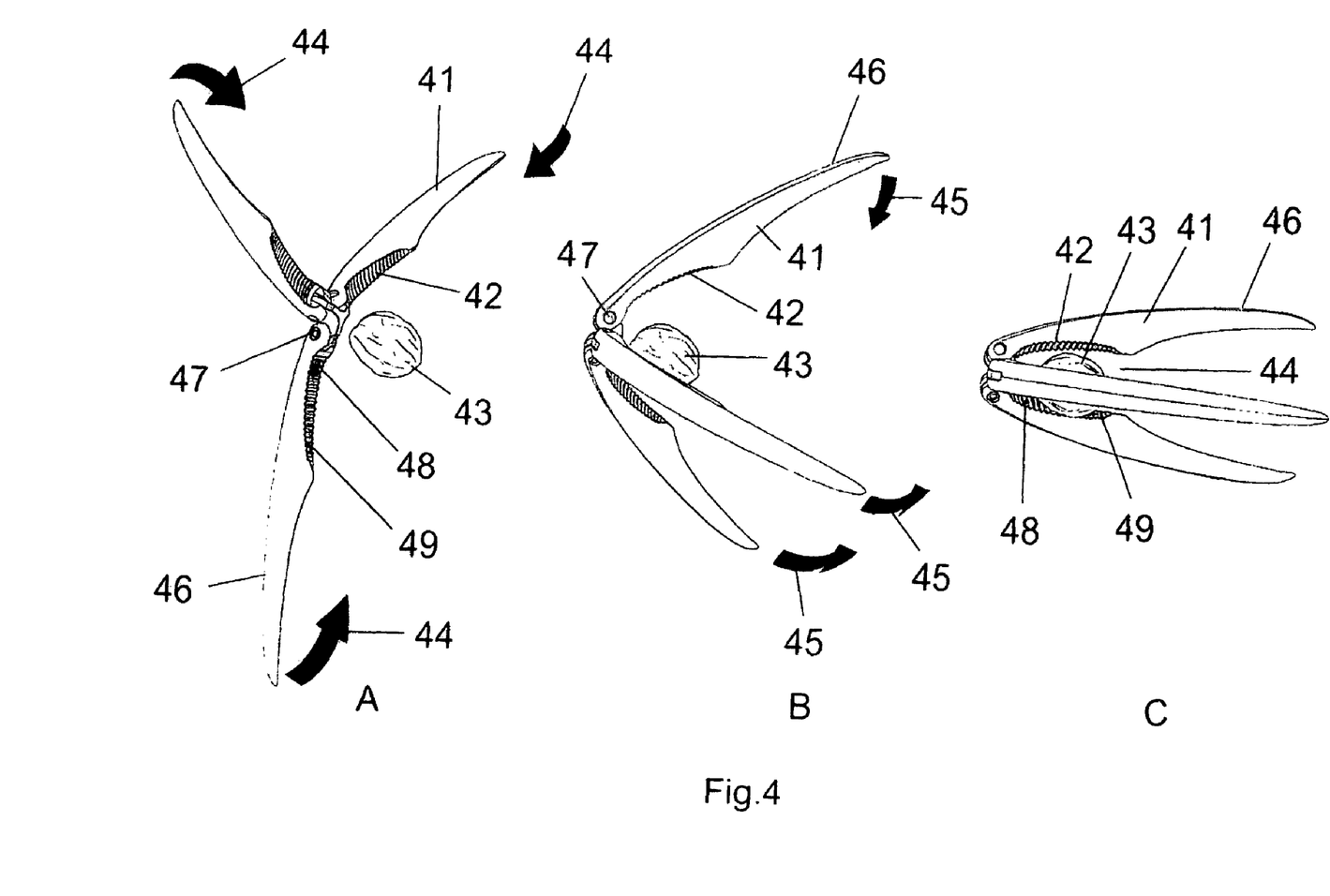
FIGS. 4A, 4B, and 4C are a sequential, side-perspective view of the invention in various stages of closing upon a nut to be cracked.

FIGS. 4A, B, and C is a side, perspective view of the invention in various stages of closing upon a nut to be cracked. In FIG. 4A, the invention is in its open position. The nut (43) has been positioned in the middle of the three cracking members (41) such that when pressure (44) is applied to the outside edge (46) of each cracking member (41), each cracking member (41) will rotate about the axis established by the eyelet (47) through which the three cracking members (41) are connected to each other, whereupon the serrated cracking surfaces (42) will begin to close in upon the nut. The upper curvature (48) and the lower curvature (49) of the serrated cracking surfaces (42) will close in around the curved surfaces at the top and bottom of the nut, thereby securing the nut for cracking. In FIG. 4B, the cracking members (41) have rotated down about the vector defined by the eyelets (47) to the point where the serrated cracking surfaces (42) have nearly enveloped the nut (43). As more pressure (45) is applied to the outside edge (46) of each cracking member, the space between the nut and the serrated cracking surfaces diminishes. In FIG. 4C, the serrated cracking surfaces (42) have been moved close enough to the nut (43) that there is not enough space (44) for the nut to escape the serrated cracking surfaces (42). Each serrated cracking surface has also contained the nut between its upper curvature (48) and lower curvature (49). As more pressure is applied to the outside surface (46) of the cracking members (41), the serrated cracking surfaces (42) will touch the nutshell and begin the cracking process.

Figure 5:
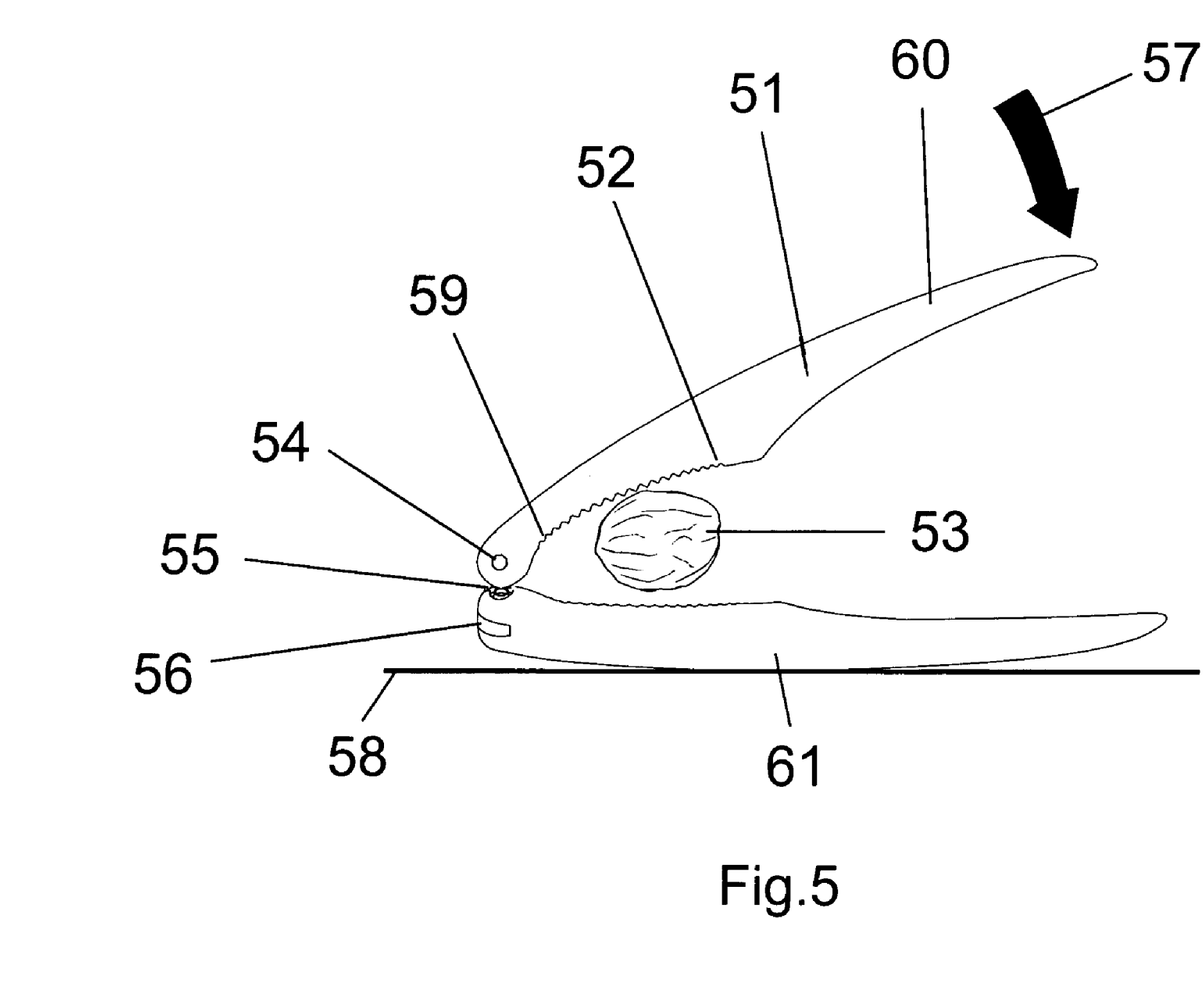
FIG. 5 is a side view of the invention as seen when two of the cracking members are laid down upon a table or other flat surface and the third cracking member is used to apply pressure upon a nut.

FIG. 5 is a side view of the invention as seen when two of the cracking members (61) are laid down upon a table or other flat surface (58) and the third cracking member (51) is used to apply pressure upon a nut (53). This use of the invention allows a person with small hands or without adequate hand strength to use the invention in the traditional manner of grasping the cracking members in one or two hands and cracking open the nut. In this manner of use of the invention, pressure (57) is applied to the outside edge (60) of the third cracking member (51) such that the third cracking member rotates about its eyelet, remaining connected to the other two cracking members (61) through the connecting member (barely visible as 55). This illustration also shows how the partition of the connecting member fills the slot (56) in the top of each connecting member.

Figure 6:
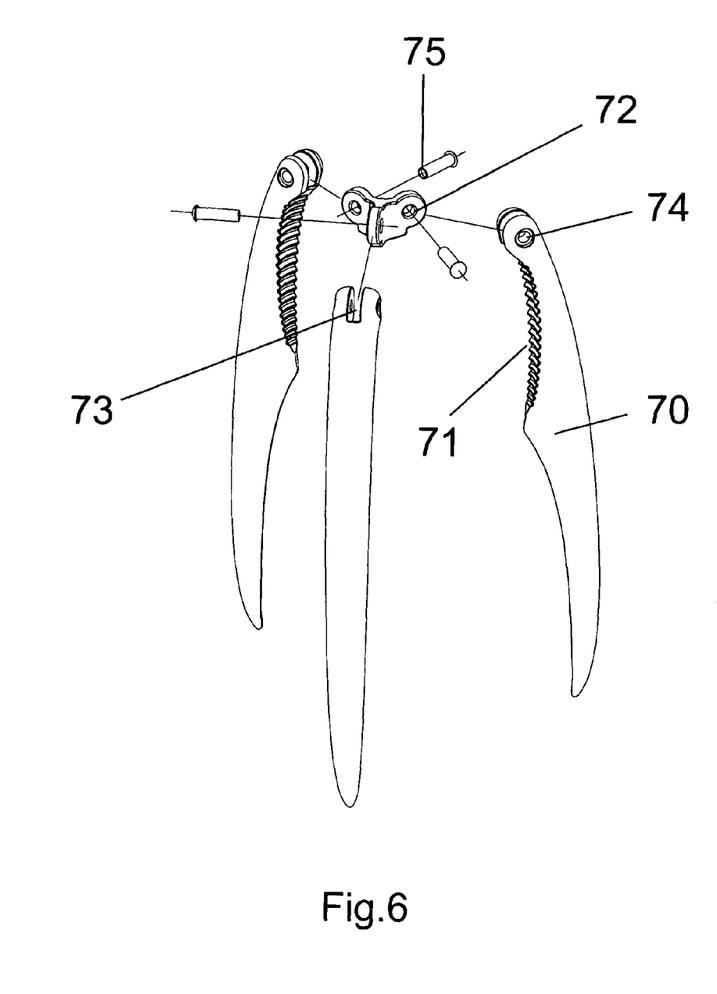
FIG. 6 is an exploded, side perspective view of the invention taken apart to show how the different parts of the invention fit together.

FIG. 6 is an exploded, elevational, side-perspective view of the invention taken apart to show how the different parts of the invention fit together. Each cracking member (70) has a serrated cracking surface (71), a slot (73), and an eyelet (74). There is a connecting member (72) which as many partitions radiating out from the central core of the connecting member as there are cracking members (in this illustration, three). Each partition has a hole which can be lined up with the eyelet (74) at the top of each cracking member (70). Through the eyelets (74) and holes in the partitions of the connecting member (72) is insert a snap pin (75) which holds the cracking members to the connecting member and allows each cracking member to rotate about a plane 120 degrees from the other cracking members. The snap pins (75) can be removed for cleaning of the invention.

Each eyelet (74) has a central hole and an outer countersunk cavity, where the countersunk cavity has an outer edge or lip of slightly lesser diameter than the main body of the countersunk cavity such that the outer edge can retain an object pushed past the outer edge. Each snap pin (75) has a round body part slightly smaller than the diameter of the eyelets and the holes in the partitions of the connecting member, and an end part which is slightly larger than the eyelet, such that when the snap pin is inserted into the eyelet on one side of the cracking member, the snap pin can slide through the hole in the partition, and through the central hole on the other eyelet on the other side of the cracking member, until the end part of the snap pin is pushed past the outer edge and enters the countersunk cavity in the eyelet, whereupon the end part of the snap pin will snap into the countersunk cavity of the eyelet and be retained there, thereby securing each cracking member to the connecting member, such that each cracking member can rotate about an axis defined by the direction of the partition of the connecting member and limited in its rotation at one extreme—the open position—by the outside edges of the cracking members touching each other, and at the other extreme—the closed position—by the inside edges of the cracking members touching each other.

What I claim is:

1. A device for cracking nuts or the shells of crabs and lobster, comprising: three or more cracking members, a connecting member, and means of attaching the cracking members to the connecting member, where each of the three or more cracking members is directly attached to the connecting member, where each cracking member additionally comprises a tip, an outside edge, a serrated cracking surface with an upper curvature and a lower curvature, where the serrated cracking surface is concave, where each cracking member additionally comprises a slot at the top portion of the cracking member, two eyelets projecting out from either side of the slot at the top of the cracking member, where the eyelet has a central hole and an outer countersunk cavity, where the countersunk cavity has an outer edge or lip of slightly lesser diameter than the main body of the countersunk cavity such that the outer edge can retain an object pushed past the outer edge.

2. The device of claim 1, where the each cracking member has two sides, and the outside edge has a centerline, where the centerline is an apex of a slight rise up from each side of the cracking member, and where the centerline allows a user of the invention to hold the cracking member firmly in his or her hand through the function of the centerline in creating a slight, temporary crease in the user's hand such that the grasping member does not slide out to the side as pressure is applied to it.

3. The device of claim 1, where the connecting member consists of a central core and three or more partitions, where the partitions radiate out from the central core and each partition has in its approximate center a hole, where, the partitions are of a size that can slide into the slot at the top of the cracking member, and, where, the holes in the partitions of the connecting member can line up with the central hole of the eyelets in the cracking member, such that the central hole of the eyelets are aligned with the holes of the partitions, where the cracking members pivot about the connecting member allowing the cracking members to rotate, where all of the three or more cracking members do not rotate in the same plane.

4. The device of claim 1, where the means of connecting the cracking members to the connecting member is three or more snap pins, where the snap pins have a round body part slightly smaller than the diameter of the eyelets and the holes in the partitions of the connecting member, and an end part which is slightly larger than the eyelet, such that when the snap pin is inserted into the eyelet on one side of the cracking member, the snap pin can slide through the hole in the partition, and through the central hole on the other eyelet on the other side of the cracking member, until the end part of the snap pin is pushed past the outer edge and enters the countersunk cavity in the eyelet, whereupon the end part of the snap pin will snap into the countersunk cavity of the eyelet and be retained there, thereby securing each cracking member to the connecting member, such that each cracking member can rotate about an axis defined by the direction of the partition of the connecting member and limited in its rotation at one extreme by the open position with the outside edges of the cracking members touching each other, and at the other extreme by the closed position with the inside edges of the cracking members touching each other.

5. The device of claim 1, where the connecting member consists of a central core and three or more partitions, where the partitions radiate out from the central core and each partition has in its approximate center a hole, where, the partitions are of a size that can slide into the slot at the top of the cracking member, and, where, the holes in the partitions of the connecting member can line up with the central hole of the eyelets in the cracking member, such that the central hole of the eyelets are aligned with the holes of the partitions, and, where the means of connecting the cracking members to the connecting member is three or more snap pins, where the snap pins have a round body part slightly smaller than the diameter of the eyelets and the holes in the partitions of the connecting member, and an end part which is slightly larger than the eyelet, such that when the snap pin is inserted into the eyelet on one side of the cracking member, the snap pin can slide through the hole in the partition, and through the central hole on the other eyelet on the other side of the cracking member, until the end part of the snap pin is pushed past the outer edge and enters the countersunk cavity in the eyelet, whereupon the end part of the snap pin will snap into the countersunk cavity of the eyelet and be retained there, thereby securing each cracking member to the connecting member, such that each cracking member can rotate about an axis defined by the direction of the partition of the connecting member and limited in its rotation at one extreme by the open position with the outside edges of the cracking members touching each other, and at the other extreme by the closed position with the inside edges of the cracking members touching each other.

6. The device of claim 1, where the connecting member consists of a central core and three or more partitions, where the partitions radiate out from the central core and each partition has in its approximate center a hole, where, the partitions are of a size that can slide into the slot at the top of the cracking member, and, where, the holes in the partitions of the connecting member can line up with the central hole of the eyelets in the cracking member, such that the central hole of the eyelets are aligned with the holes of the partitions, and, where the means of connecting the cracking members to the connecting member is three or more snap pins, where the snap pins have a round body part slightly smaller than the diameter of the eyelets and the holes in the partitions of the connecting member, and an end part which is slightly larger than the eyelet, such that when the snap pin is inserted into the eyelet on one side of the cracking member, the snap pin can slide through the hole in the partition, and through the central hole on the other eyelet on the other side of the cracking member, until the end part of the snap pin is pushed past the outer edge and enters the countersunk cavity in the eyelet, whereupon the end part of the snap pin will snap into the countersunk cavity of the eyelet and be retained there, thereby securing each cracking member to the connecting member, such that each cracking member can rotate about an axis defined by the direction of the partition of the connecting member and limited in its rotation at one extreme by the open position with the outside edges of the cracking members touching each other, and at the other extreme by the closed position with the inside edges of the cracking members touching each other.

7. The device of claim 6, where, the snap pin is of a length such that after the snap pin is inserted through the eyelet, partition, and matching eyelet on the other side of the cracking member, and pushed past the outer edge into the countersunk cavity, a portion of the body part snap pin protrudes from the eyelet that does not contain the end part of the snap pin, such that a user who wishes to remove the snap pin from the device merely has to push on the protruding portion of the body part of the snap pin.

8. The device of claim 6, where, the number of cracking members and the number of partitions is four.

9. A method of cracking nuts, comprising the steps of first, taking a device for cracking nuts, comprising: three or more cracking members, a connecting member, and means of attaching the cracking members to the connecting member, where each of the three or more cracking members is directly attached to the connecting member, and, second, inserting a nut into the space between the cracking members and applying pressure with a hand to at least one cracking member until the nutshell cracks, opening the nut cracking device, and, removing the nut from the nutshell, where the number of cracking members is three, where each cracking member has a serrated cracking surface,
where each cracking member additionally comprises a tip, an outside edge, a serrated cracking surface with an upper curvature and a lower curvature, where the serrated cracking surface is concave, thereby allowing the serrated cracking surface to fit around the curved surface of a nut, a slot at the top portion of the a cracking member, two eyelets projecting out from either side of the slot at the top of the cracking member, where the eyelet has a central hole and an outer countersunk cavity, where the countersunk cavity has an outer edge or lip of slightly lesser diameter than the main body of the countersunk cavity such that the outer edge can retain an object pushed past the outer edge, and where the connecting member consists of a central core and three or more partitions, where the partitions radiate out from the central core and each partition has in its approximate center a hole, where, the partitions are of a size that can slide into the slot at the top of the cracking member, and, where, the holes in the partitions of the connecting member can line up with the central hole of the eyelets in the cracking member, such that the central hole of the eyelets are aligned with the holes of the partitions, and, where the means of connecting the cracking members to the connecting member is three or more snap pins, where the snap pins have a round body part slightly smaller than the diameter of the eyelets and the holes in the partitions of the connecting member, and an end part which is slightly larger than the eyelet, such that when the snap pin is inserted into the eyelet on one side of the cracking member, the snap pin can slide through the hole in the partition, and through the central hole on the other eyelet on the other side of the cracking member, until the end part of the snap pin is pushed past the outer edge and enters the countersunk cavity in the eyelet, whereupon the end part of the snap pin will snap into the countersunk cavity of the eyelet and be retained there, thereby securing each cracking member to the connecting member, such that each cracking member can rotate about an axis defined by the direction of the partition of the connecting member and limited in its rotation at one extreme by the open position with the outside edges of the cracking members touching each other, and at the other extreme by the closed position with the inside edges of the cracking members touching each other.

10. The method of claim 9, where the second step is limited to a use where two cracking members are laid on a flat surface such as a table, the nut is inserted between the two serrated cracking surfaces laying on the flat surface and the serrated cracking surface of the single cracking member above the flat surface, after which pressure is applied to the single cracking member above the flat surface until the nutshell cracks, whereupon the cracking member is rotated up and away from the nutshell and the nut is removed from the nutshell.

11. The method of claim 9, where the second step is limited to a use where all three cracking members are held in a user hand or hands, the nut is placed in between the three serrated cracking surfaces, and all three cracking members are compressed toward each other by the user until the nutshell cracks, whereupon the cracking member is rotated up and away from the nutshell and the nut is removed from the nutshell.

12. A device for cracking nuts, comprising:
three or more cracking members, where each cracking member consists of a tip, an outside edge, a serrated cracking surface with an upper curvature and a lower curvature, where the serrated cracking surface is concave, thereby allowing the serrated cracking surface to fit around the curved surface of a nut, a slot at the top portion of the a cracking member, two eyelets projecting out from either side of the slot at the top of the cracking member, where the eyelet has a central hole and an outer countersunk cavity, where the countersunk cavity has an outer edge or lip of slightly lesser diameter than the main body of the countersunk cavity such that the outer edge can retain an object pushed past the outer edge,
a connecting member consisting of a central core and three or more partitions, where the partitions radiate out from the central core and each partition has in its approximate center a hole,
where, the partitions are of a size that can slide into the slot at the top of the cracking member, and,
where, the holes in the partitions of the connecting member can line up with the central hole of the eyelets in the cracking member, such that the central hole of the eyelets are aligned with the holes of the partitions,
and three or more snap pins, where the snap pins have a round body part slightly smaller than the diameter of the eyelets and the holes in the partitions of the connecting member, and an end part which is slightly larger than the eyelet, such that when the snap pin is inserted into the eyelet on one side of the cracking member, the snap pin can slide through the hole in the partition, and through the central hole on the other eyelet on the other side of the cracking member, until the end part of the snap pin is pushed past the outer edge and enters the countersunk cavity in the eyelet, whereupon the end part of the snap pin will snap into the countersunk cavity of the eyelet and be retained there, thereby securing each cracking member to the connecting member, such that each cracking member can rotate about an axis defined by the direction of the partition of the connecting member and limited in its rotation at one extreme by the open position with the outside edges of the cracking members touching each other, and at the other extreme by the closed position with the inside edges of the cracking members touching each other.

* * * * *